United States Patent
Sahu et al.

(10) Patent No.: US 11,989,939 B2
(45) Date of Patent: May 21, 2024

(54) SYSTEM AND METHOD FOR ENHANCING MACHINE LEARNING MODEL FOR AUDIO/VIDEO UNDERSTANDING USING GATED MULTI-LEVEL ATTENTION AND TEMPORAL ADVERSARIAL TRAINING

(71) Applicant: Samsung Electronics Co., Ltd., Suwon-si (KR)

(72) Inventors: Saurabh Sahu, San Bruno, CA (US); Palash Goyal, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 17/387,889

(22) Filed: Jul. 28, 2021

(65) Prior Publication Data

US 2022/0300740 A1    Sep. 22, 2022

Related U.S. Application Data

(60) Provisional application No. 63/162,315, filed on Mar. 17, 2021.

(51) Int. Cl.
*G06V 20/40* (2022.01)
*G06F 18/214* (2023.01)

(52) U.S. Cl.
CPC ............ *G06V 20/41* (2022.01); *G06F 18/214* (2023.01)

(58) Field of Classification Search
None
See application file for complete search history.

(56) References Cited

U.S. PATENT DOCUMENTS

| 10,176,405 B1 | 1/2019 | Zhou et al. |
| 10,403,284 B2 | 9/2019 | Olabiyi et al. |
| 10,740,640 B2 | 8/2020 | Liu et al. |

(Continued)

FOREIGN PATENT DOCUMENTS

| CN | 111858931 A | 10/2020 |
| CN | 111881849 A | 11/2020 |

(Continued)

OTHER PUBLICATIONS

Abu-El-Haija et al., "YouTube-8M: A Large-Scale Video Classification Benchmark," arXiv:1609.08675v1 [cs.CV], Sep. 2016, 10 pages.

(Continued)

*Primary Examiner* — Dov Popovici

(57) ABSTRACT

A method includes obtaining, using at least one processor, audio/video content. The method also includes processing, using the at least one processor, the audio/video content with a trained attention-based machine learning model to classify the audio/video content. Processing the audio/video content includes, using the trained attention-based machine learning model, generating a global representation of the audio/video content based on the audio/video content, generating a local representation of the audio/video content based on different portions of the audio/video content, and combining the global representation of the audio/video content and the local representation of the audio/video content to generate an output representation of the audio/video content. The audio/video content is classified based on the output representation.

27 Claims, 7 Drawing Sheets

(56) References Cited

U.S. PATENT DOCUMENTS

| | | | |
|---|---|---|---|
| 10,860,860 B1 | 12/2020 | Huynh et al. | |
| 11,704,907 B2* | 7/2023 | Karianakis | G06N 3/084 |
| | | | 382/103 |
| 11,849,245 B2* | 12/2023 | Dasdan | G06V 40/174 |
| 2017/0262705 A1 | 9/2017 | Li et al. | |
| 2018/0060666 A1 | 3/2018 | Song et al. | |
| 2019/0163977 A1 | 5/2019 | Chen et al. | |
| 2019/0354797 A1 | 11/2019 | Nesta et al. | |
| 2020/0349414 A1 | 11/2020 | Bazhenov et al. | |
| 2021/0089904 A1 | 3/2021 | Chung et al. | |
| 2021/0279525 A1* | 9/2021 | Goyal | G06V 10/776 |
| 2022/0215649 A1* | 7/2022 | Yao | G06V 10/764 |
| 2022/0245424 A1* | 8/2022 | Goyal | G06V 10/82 |

FOREIGN PATENT DOCUMENTS

| | | |
|---|---|---|
| KR | 10-2021-0018600 A | 2/2021 |
| WO | 2020/190112 A1 | 9/2020 |
| WO | 2021062133 A1 | 4/2021 |

OTHER PUBLICATIONS

Goodfellow et al., "Explaining and Harnessing Adversarial Examples," ICLR 2015 Conference Paper, 2015, 11 pages.

Lee et al., "The 2nd YouTube-8M Large-Scale Video Understanding Challenge," ECCV 2018 Workshop Paper, 2018, 13 pages.

Sahu et al., "Cross-modal Non-linear Guided Attention and Temporal Coherence in Multi-modal Deep Video Models," MM 2020, Association for Computing Machinery, Oct. 2020, 9 pages.

Shazeer et al., "Outrageously Large Neural Networks: The Sparsely-Gated Mixture-of-Experts Layer," arXiv:1701.06538v1 [cs.LG], Jan. 2017, 19 pages.

Vaswani et al., "Attention Is All You Need," NIPS'17: Proceedings of the 31st International Conference on Neural Information Processing Systems, Dec. 2017, 11 pages.

Wei et al., "Sparse Adversarial Perturbations for Videos," arXiv:1803.02536v1 [cs.CV], Mar. 2018, 7 pages.

Qiao et al., "DetectoRS: Detecting Objects with Recursive Feature Pyramid and Switchable Atrous Convolution," arXiv:2006.02334 [cs.CV], Jun. 2020, 12 pages.

Kmiec et al., "Learnable Pooling Methods for Video Classication," arXiv:1810.00530 [cs.CV], Oct. 2018, 11 pages.

Bertasius et al., "Is Space-Time Attention All You Need for Video Understanding?," arXiv:2102.05095v4 [cs.CV], Jun. 2021, 13 pages.

International Search Report and Written Opinion of the International Searching Authority dated Jun. 17, 2022 in connection with International Patent Application No. PCT/KR2022/003784, 8 pages.

* cited by examiner

SYSTEM AND METHOD FOR ENHANCING MACHINE LEARNING MODEL FOR AUDIO/VIDEO UNDERSTANDING USING GATED MULTI-LEVEL ATTENTION AND TEMPORAL ADVERSARIAL TRAINING

CROSS-REFERENCE TO RELATED APPLICATION AND PRIORITY CLAIM

This application claims priority under 35 U.S.C. § 119(e) to U.S. Provisional Patent Application No. 63/162,315 filed on Mar. 17, 2021, which is hereby incorporated by reference in its entirety.

TECHNICAL FIELD

This disclosure relates generally to machine learning systems. More specifically, this disclosure relates to a system and method for enhancing a machine learning model for audio/video understanding using gated multi-level attention and temporal adversarial training.

BACKGROUND

Audio/video understanding and categorization is a useful task in various types of systems, such as in systems that make content recommendations, deliver advertisements, or fill in missing metadata. For example, identifying categories of audio or video content selected by a user can be performed to help with the recommendation of additional audio or video content to the user. State-of-the-art machine learning models can be trained to perform these types of operations. For instance, deep attention models can be trained to assign weights to each frame in a video based on other frames in the same video.

SUMMARY

This disclosure relates to a system and method for enhancing a machine learning model for audio/video understanding using gated multi-level attention and temporal adversarial training.

In a first embodiment, a method includes obtaining, using at least one processor, audio/video content. The method also includes processing, using the at least one processor, the audio/video content with a trained attention-based machine learning model to classify the audio/video content. Processing the audio/video content includes, using the trained attention-based machine learning model, generating a global representation of the audio/video content based on the audio/video content, generating a local representation of the audio/video content based on different portions of the audio/video content, and combining the global representation of the audio/video content and the local representation of the audio/video content to generate an output representation of the audio/video content. The audio/video content is classified based on the output representation.

In a second embodiment, an apparatus includes at least one processor configured to obtain audio/video content and process the audio/video content with a trained attention-based machine learning model to classify the audio/video content. To process the audio/video content, the at least one processor is configured to use the trained attention-based machine learning model to generate a global representation of the audio/video content based on the audio/video content, generate a local representation of the audio/video content based on different portions of the audio/video content, and combine the global representation of the audio/video content and the local representation of the audio/video content to generate an output representation of the audio/video content. The audio/video content is classified based on the output representation.

In a third embodiment, a non-transitory computer readable medium contains instructions that when executed cause at least one processor to obtain audio/video content and process the audio/video content with a trained attention-based machine learning model to classify the audio/video content. The instructions that when executed cause the at least one processor to process the audio/video content include instructions that when executed cause the at least one processor to generate a global representation of the audio/video content based on the audio/video content, generate a local representation of the audio/video content based on different portions of the audio/video content, and combine the global representation of the audio/video content and the local representation of the audio/video content to generate an output representation of the audio/video content. The audio/video content is classified based on the output representation.

In a fourth embodiment, a method includes obtaining training samples and generating adversarial counterpart samples for the training samples. The method also includes training an attention-based machine learning model to (i) generate a global representation of audio/video content based on the audio/video content, (ii) generate a local representation of the audio/video content based on different portions of the audio/video content, and (iii) combine the global representation of the audio/video content and the local representation of the audio/video content to generate an output representation of the audio/video content. The audio/video content is classified based on the output representation. The attention-based machine learning model is trained using the training samples and the adversarial counterpart samples to (i) reduce or minimize differences between attention maps generated by the attention-based machine learning model for the training samples and the adversarial counterpart samples and (ii) reduce or minimize differences between output representations generated by the attention-based machine learning model for the training samples and the adversarial counterpart samples.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
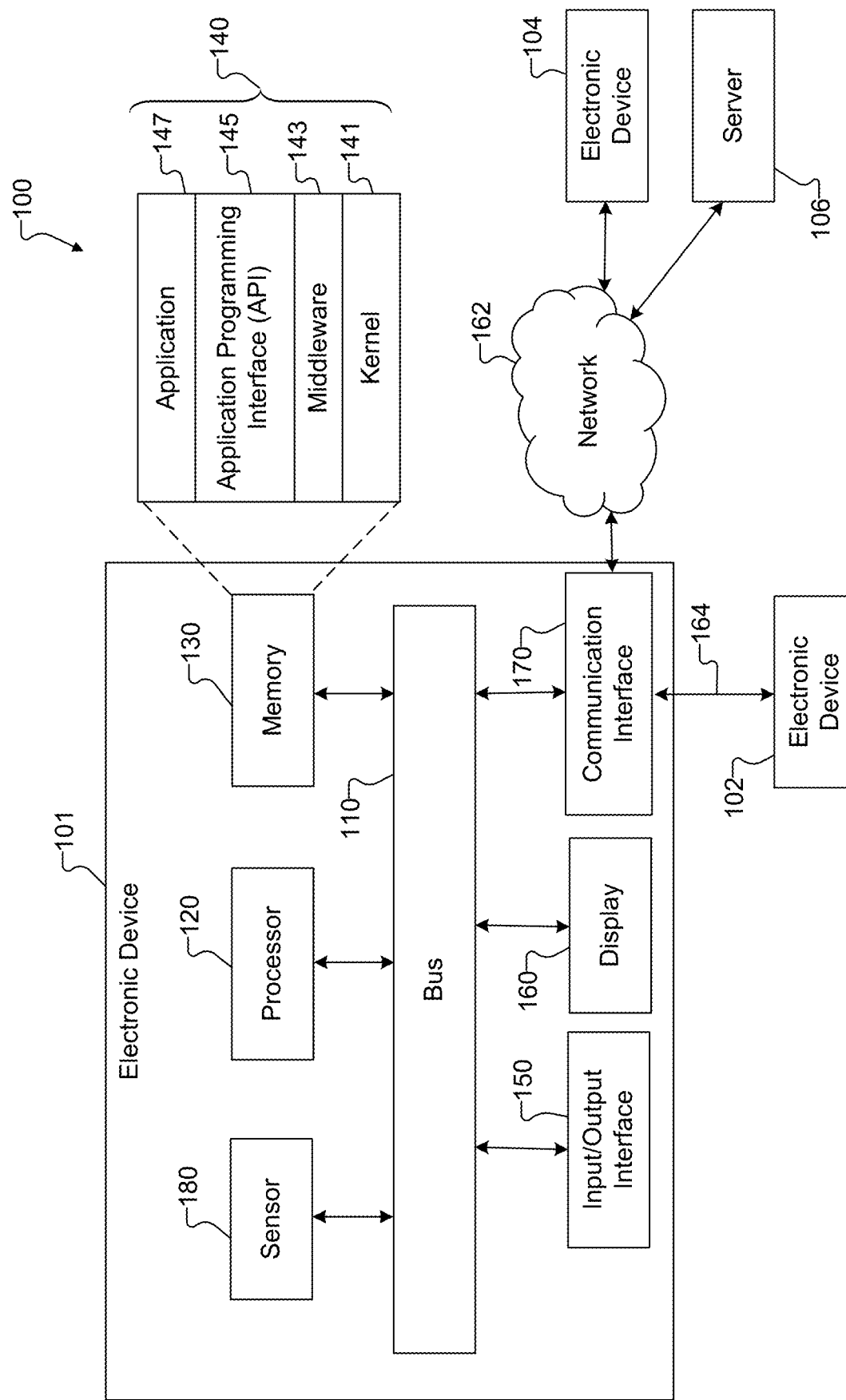
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, audio/video understanding and categorization is a useful task in various types of systems, such as in systems that make content recommendations, deliver advertisements, or fill in missing metadata. For example, identifying categories of audio or video content selected by a user can be performed to help with the recommendation of additional audio or video content to the user. State-of-the-art machine learning models can be trained to perform these types of operations. For instance, deep attention models can be trained to assign weights to each frame in a video based on other frames in the same video. However, these approaches can suffer from a number of shortcomings.

Among other things, model predictions depend highly on attention weights used by the machine learning models. As a result, incorrect predictions of content classifications may occur if higher weights are given to one or more irrelevant image frames or other portions of audio/video content or if higher weights are given to only a few relevant image frames or other portions of audio/video content. As one particular example of this, a soccer video may include scenes of a stadium, and a machine learning model may improperly give a very high weight to the stadium frame(s) such that the prediction score for soccer is low. As another particular example of this, a news video may cover topics involving sports, politics, and weather, and a model may give high weights to the sports and politics portions but not to the weather portions. These types of machine learning models can also be prone to adversarial attacks, meaning minor imperceptible changes in audio or video content can lead to dramatic changes in a model's predictions.

This disclosure provides techniques for enhancing a machine learning model for audio/video understanding using gated multi-level attention and temporal adversarial training. As described in more detail below, a machine learning model is trained to use multi-level attention, meaning attention at a global scale of audio/video content and attention at a local scale within smaller portions of the audio/video content. This is achieved using multi-level gated attention operations that determine attention locally and globally and that weight the local and global attentions based on the audio/video content being processed. This allows final predictions by the machine learning model to be based on local and global contexts since the audio/video content's attention can be determined both locally and globally. This helps to improve coverage and precision of content predictions made by the machine learning model.

Moreover, the machine learning model can be trained using a training scheme that makes the machine learning model more robust to adversarial attacks. This is accomplished using a temporal adversarial training scheme in which the machine learning model is trained to be robust to adversarial examples at two levels, namely at the attention level and at the output level. That is, the machine learning model is trained to both (i) give accurate global attention and give accurate local attention to audio/video content and (ii) generate accurate output representations of the audio/video content. This can be achieved by generating an adversarial counterpart sample for each training sample used to train the machine learning model, and the machine learning model can be modified during training to both (i) reduce differences between attention maps or other values generated for the training samples and their adversarial counterpart samples and (ii) reduce differences between outputs of the machine learning model for the training samples and their adversarial counterpart samples. This approach results in machine learning models that are trained to be more robust to adversarial attacks and that improve the generalizability of the machine learning models.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process audio/video content using a machine learning model that supports gated multi-level attention as described in more detail below. Also or alternatively, in some embodiments of this disclosure, the processor 120 may train such a machine learning model based on temporal adversarial training as described in more detail below. Note that the phrase "audio/video content" refers to (i) audio content only, (ii) video content only, or (iii) a combination of audio content and video content.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process audio/video content using a machine learning model that supports gated multi-level attention. The application 147 may also or alternatively include one or more applications that, among other things, train such a machine learning model based on temporal adversarial training. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process audio/video content using a machine learning model that supports gated multi-level attention as described in more detail below. Also or alternatively, in some embodiments of this disclosure, the server 106 may train such a machine learning model based on temporal adversarial training as described in more detail below, and the trained machine learning model can then be provided to various other devices (such as the electronic device 101) for actual use.

Note that a machine learning model supporting gated multi-level attention and the training of such a machine learning model can be used in any suitable device or system to provide any desired functionality in that device or system. For example, this functionality may be used by the electronic device 101 or the server 106 to support a content recommendation system, such as to support the classification of audio/video content that is being or has been provided to one or more users or requested by the one or more users. The classification of this audio/video content allows a device or system to understand the preferences of the one or more users more accurately, which may allow the device or system to more effectively recommend additional audio/video content that might be of interest to the one or more users. Moreover, the adversarial training allows the overall device or system to be robust and generalize new audio/video content well.

As another example, this functionality may be used by the electronic device 101 or the server 106 to support an advertising system, such as to support the classification of audio/video content (like prior advertisements) that has been requested by one or more users or with which the one or more users have interacted or shown interest. The classification of this audio/video content allows a device or system to understand the interests and tastes of the one or more users more accurately. This information can be used to provide additional audio/video content (such as additional advertisements) targeted to the one or more users. This may also allow for the identification of additional categories of advertisements that might be of interest to the one or more users. Moreover, the adversarial training allows the overall device or system to be robust and to support the targeting of wider sets of advertisements to users.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system. In addition, while (i) a machine learning model supporting gated multi-level attention and (ii) training of such a machine learning model are described here, both features may be implemented together in the same device or system, or different devices or systems may implement different ones of these features (or different portions thereof).

Figure 2:
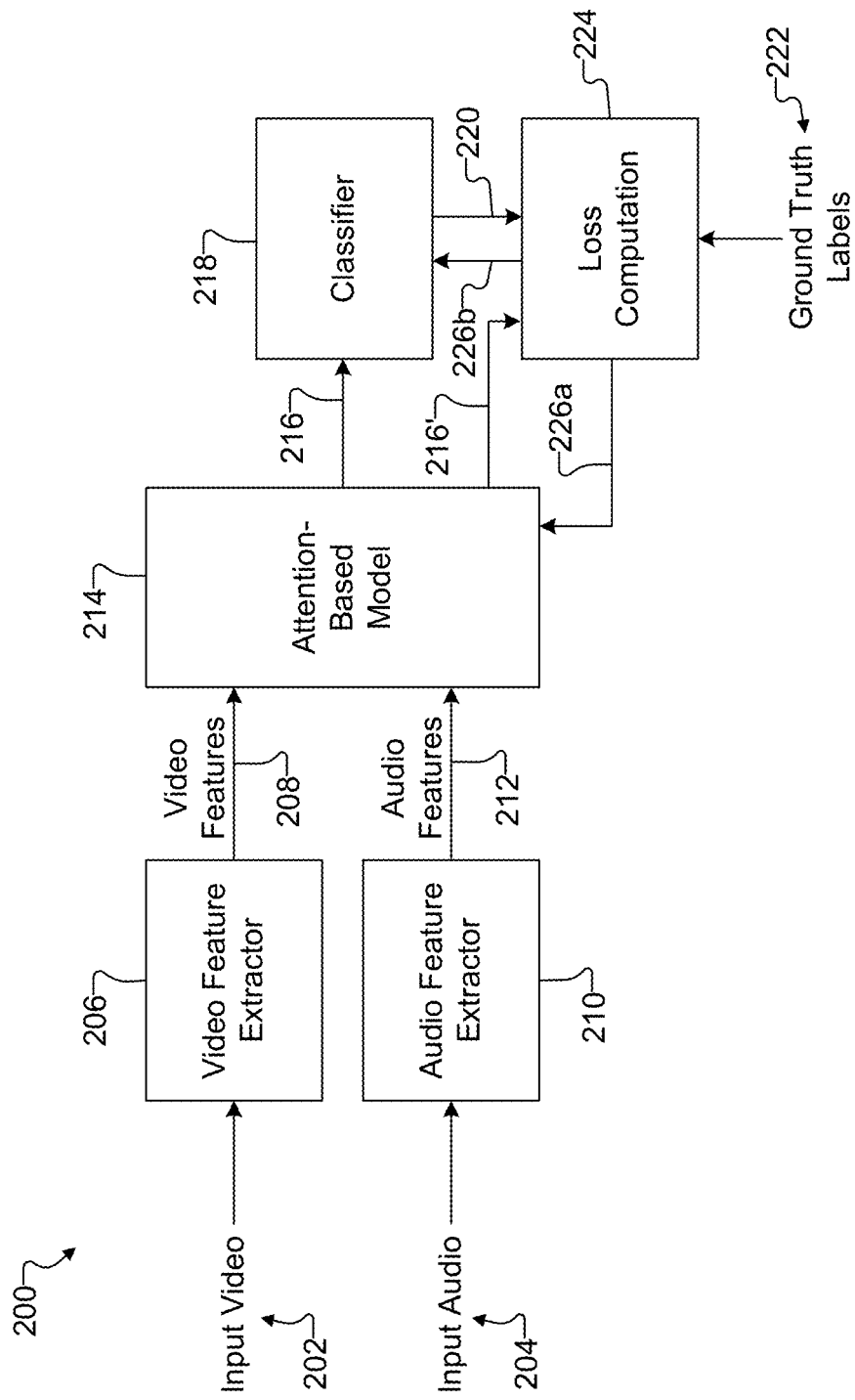
FIG. 2 illustrates a first example architecture for training a machine learning model based on gated multi-level attention and temporal adversarial training and for using the machine learning model to perform audio/video understanding in accordance with this disclosure.

FIG. 2 illustrates a first example architecture 200 for training a machine learning model based on gated multi-level attention and temporal adversarial training and for using the machine learning model to perform audio/video understanding in accordance with this disclosure. For ease of explanation, the architecture 200 may be used by the processor 120 of the electronic device 101 and/or the server 106 in the network configuration 100 of FIG. 1. However, the architecture 200 may be implemented using any other suitable device and in any other suitable system.

As shown in FIG. 2, the architecture 200 receives input data in the form of input video data 202 and input audio data 204. For example, the video data 202 may include a sequence of images, and the audio data 204 may include audio signals associated with the sequence of images. The input data 202 and 204 may be obtained from any suitable source(s). In some embodiments, for instance, the input data 202 and 204 may represent audio/video content that has been or is being provided to a user device (such as the electronic device 101) or that has been requested by a user of the user device. In other cases, the input data 202 and 204 may represent audio/video content from one or more other sources. Note that while both input video data 202 and input audio data 204 are received here, the architecture 200 may be configured to receive and process only input video data 202 or only input audio data 204.

The input video data 202 is provided to a video feature extractor 206, which functions as an encoder and generally operates to extract high-level video features 208 from the input video data 202. The high-level video features 208 may represent feature maps or other encoded information representing different aspects of the input video data 202. The video feature extractor 206 includes any suitable logic configured to identify features of video data, such as convolution and pooling neural network layers. Similarly, the input audio data 204 is provided to an audio feature extractor 210, which functions as an encoder and generally operates to extract high-level audio features 212 from the input audio data 204. The high-level audio features 212 may represent feature maps or other encoded information representing different aspects of the input audio data 204. The audio feature extractor 210 includes any suitable logic configured to identify features of audio data, such as convolution and pooling neural network layers.

The high-level video features 208 and the high-level audio features 212 are provided to an attention-based machine learning model 214, which processes the features 208 and 212 to generate one or more output representations 216 of the input data. The one or more output representations 216 represent encoded representations of the input video data 202 and the input audio data 204. The attention-based machine learning model 214 represents a gated adversarial transformer, which (as described below) supports multi-headed self-attention processing to generate context-aware output representations of the input data at both global and local levels.

The output representations 216 are provided to a classifier function 218 for further processing. For example, the classifier function 218 can use the output representations 216 to classify the input data 202 and 204, such as to classify a general category or categories to which each instance of the input data 202 and 204 belongs, and generate classified outputs 220 (which represent predictions, such as predicted classifications). The classifier function 218 includes any suitable logic configured to classify input data based on output representations of an attention-based machine learning model, such as a multi-layer perceptron.

To train the machine learning model 214 and the classifier function 218 during a training phase, the input data 202 and 204 (or the extracted features 208 and 212) can represent known training data. The training data is associated with ground truth labels 222, which (among other things) identify the expected or desired outputs of the machine learning model 214 or the classifier function 218 when processing the training data. Temporal adversarial training can also be used to generate adversarial training data based on the known training data, and the adversarial training data can be used as part of the training process. The machine learning model 214 and the classifier function 218 are trained iteratively during the training phase so that predictions generated using the machine learning model 214 and the classifier function 218 using the known training data and the adversarial training data are close to or match the ground truth labels 222.

In this example, a loss computation function 224 calculates loss values based on differences between (i) predictions generated using the machine learning model 214 and the classifier function 218 using the known and adversarial training data and (ii) the ground truth labels 222. This provides a measure of loss at the output level of the machine learning model 214 or the classifier function 218. As described below, the loss values are also calculated based on differences between global attention maps and/or local attention maps (collectively attention maps 216') generated by the machine learning model 214 using the known and adversarial training data. This provides a measure of loss at the attention level of the machine learning model 214. When the loss values are excessive (such as above a threshold value), the loss computation function 224 modifies one or more parameters 226a of the machine learning model 214 and/or one or more parameters 226b of the classifier function 218. The machine learning model 214 is used with the modified parameter(s) 226a to generate additional output representations 216 using the known and adversarial training data, the classifier function 218 is used with the modified parameter(s) 226b to generate additional classified outputs 220, and additional loss values can be determined by the loss computation function 224. Ideally, the loss values determined by the loss computation function 224 decrease over time. This process may repeat any number of times until the loss values determined by the loss computation function 224 converge or until a specific number of iterations or a specified amount of time has elapsed. At this point, the machine learning model 214 and the classifier function 218 may be considered to be "trained."

To use the trained machine learning model 214 and the classifier function 218 during an inferencing phase, the input data 202 and 204 can represent real-world data provided to the machine learning model 214. During the inferencing phase, the machine learning model 214 generates output representations 216 representing the input data 202 and 204, and the output representations 216 can be provided to the classifier function 218 for further processing. The classified outputs 220 from the classifier function 218 can be used in any suitable manner.

Additional details regarding the structure and training of the machine learning model 214 are provided below. Note that the operations and functions described above with reference to FIG. 2 can be implemented in an electronic device 101, 102, 104, server 106, or other device in any suitable manner. For example, in some embodiments, the operations and functions described above with reference to FIG. 2 can be implemented or supported using one or more software applications or other software instructions that are executed by at least one processor 120 of a device. In other embodiments, at least some of the operations and functions described above with reference to FIG. 2 can be implemented or supported using dedicated hardware components. In general, the operations and functions described above with reference to FIG. 2 can be performed using any suitable hardware or any suitable combination of hardware and software/firmware instructions.

Although FIG. 2 illustrates a first example of an architecture 200 for training a machine learning model 214 based on gated multi-level attention and temporal adversarial training and for using the machine learning model 214 to perform audio/video understanding, various changes may be made to FIG. 2. For example, a device that uses the trained attention-based machine learning model 214 and the classifier function 218 during inferencing may lack a loss computation function 224.

Figure 3:
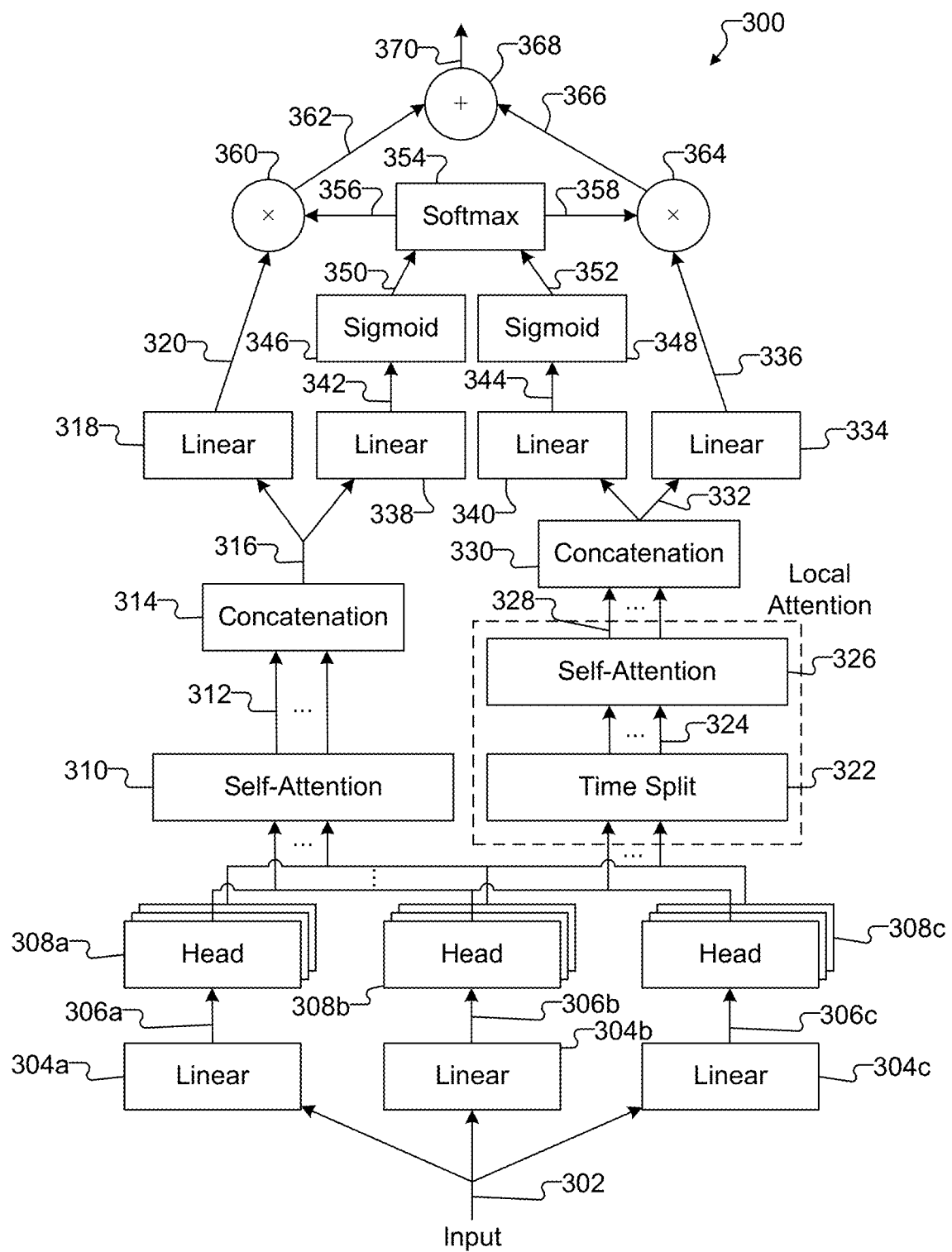
FIG. 3 illustrates an example architecture supporting gated multi-level attention in a machine learning model for audio/video understanding in accordance with this disclosure.

FIG. 3 illustrates an example architecture 300 supporting gated multi-level attention in a machine learning model for audio/video understanding in accordance with this disclosure. The architecture 300 may, for example, represent the architecture of the attention-based machine learning model 214 of FIG. 2, which may be used by the processor(s) 120 of the electronic device 101 and/or the server 106 in the network configuration 100 of FIG. 1. However, the attention-based machine learning model 214 may be implemented using any other suitable architecture and using any other suitable device(s) or system(s).

As shown in FIG. 3, the architecture 300 receives inputs 302, which represent the high-level video features 208 and/or the high-level audio features 212. As described above, these features 208 and 212 respectively represent encoded characteristics of the input video data 202 and the input audio data 204. In some cases, the inputs 302 include matrices containing the high-level video features 208 and/or the high-level audio features 212. The inputs 302 are provided to different linear transformation functions 304a-304c, which operate to transform the features 208, 212 contained in the inputs 302 into transformed outputs 306a-306c. In some embodiments, the transformed outputs 306a-306c include query (Q) matrices, key (K) matrices, and value (V) matrices. These matrices can be generated by multiplying the inputs 302 by learnable matrices (matrices that are generated during training of the architecture 300). In this example, there are three linear transformation functions 304a-304c, which can be used to respectively generate the query matrices, key matrices, and value matrices. The linear transformation functions 304a-304c may use any suitable technique to generate the query, key, and value matrices, such as matrix multiplication.

The transformed outputs 306a-306c from the linear transformation functions 304a-304c are each divided into multiple attention heads 308a-308c, respectively. Each attention head 308a-308c represents a portion of one of the transformed outputs 306a-306c from one of the linear transformation functions 304a-304c. For example, each attention head 308a-308c may represent a portion of a query, key, or value matrix. As a particular example, assume a query, key, or value matrix has dimensions of T×D, where each row of the matrix has dimensions of 1×D and represents a D-dimensional feature representation for a particular one of T time frames associated with the inputs 302. The query, key, or value matrix can be split by dividing the matrix into T×(D/M) sections among M attention head 308a, 308b, or 308c. Note that queries and keys (rows or vectors from the query and key matrices) may have a common dimension denoted $d_k$ and that values (rows or vectors from the value matrix) may have a dimension denoted $d_v$.

To support the use of global attention, the attention heads 308a-308c are provided to a multi-head self-attention function 310, which uses the attention heads 308a-308c to generate global attention maps and uses the global attention maps to generate global output representations 312 associated with the inputs 302. A global attention map generally represents a measure of the relatedness or association between a query (a vector from the query matrix) and a key (a vector from the key matrix), and a global output representation 312 generally represents a product of the global attention map and a value (a vector from the value matrix). The calculation of self-attention is described in Vaswani et al., "Attention Is All You Need," NIPS'17: Proceedings of the 31st International Conference on Neural Information Processing Systems, December 2017, pages 6000-6010 (which is hereby incorporated by reference in its entirety). In these embodiments, a global output representation 312 can be generated as follows:

$$\text{Attention}(Q, K, V) = \text{softmax}\left(\frac{QK^T}{\sqrt{d_k}}\right)V \quad (1)$$

Here, Q, K, and V represent the query, key, and value matrices, respectively. Also, $K^T$ represents a transpose of the key matrix. In addition, softmax( ) represents the softmax function and is used to normalize the output of the self-attention computation. Overall, the self-attention function 310 here uses self-attention (similarities between its own inputs), and the process is multi-headed since the inputs to the self-attention function 310 are divided into attention heads 308a-308c.

Note that a global attention map and an associated global output representation 312 can be generated for each collection of (i) an attention head 308a from the first linear transformation function 304a, (ii) the associated attention head 308b from the second linear transformation function 304b, and (iii) the associated attention head 308c from the third linear transformation function 304c. This results in a collection of global output representations 312 generated using the various collections of attention heads 308a-308c. The global output representations 312 are provided to a concatenation function 314, which concatenates or otherwise combines the global output representations 312 to generate a context-aware combined global output representation 316 of the inputs 302. The combined global output representation 316 is provided to a linear transformation function 318, which operates to transform the combined global output representation 316 into a global representation 320 of the input video data 202 and/or the input audio data 204. This may be accomplished, for example, by having the linear transformation function 318 multiply the combined global output representation 316 with a learnable matrix. This process generally allows the global representation 320 to represent how different features 208, 212 contained in the inputs 302 are related to one another globally over the entire length of the input video data 202 and/or the input audio data 204.

In some embodiments, the determination and use of global attention can be expressed as follows. Given D-dimensional input features for T time frames, temporal information is encoded with positional encoding (using the video feature extractor 206 and/or the audio feature extractor 210) to generate a representation $X \in R^{T \times D}$ (the video features 208 and/or the audio features 212). Here, X may represent an input feature matrix (such as one containing audio/video features), where the $i^{th}$ row denotes the feature vector extracted for the $i^{th}$ time frame. The input representation X is processed using the linear transformation functions 304a-304c to generate the transformed outputs 306a-306c. The transformed outputs 306a-306c are divided into attention heads 308a-308c, which are processed by the self-attention function 310 to generate the global output representations 312. The global output representations 312 are combined and processed to generate the global representation 320. The operations of the linear transformation functions 304a-304c, the self-attention function 310, the concatenation function 314, and the linear transformation function 318 can be expressed as follows.

$$Q_m = XW_m^q; K_m = XW_m^k; V_m = XW_m^v \quad (2)$$

$$A_m = \text{softmax}\left(\frac{Q_m K_m^T}{\sqrt{d_m}}\right) \quad (3)$$

$$O_{gm} = A_m \cdot V_m \quad (4)$$

$$Y^g = \text{concat}(O_{g1}, \ldots, O_{gM}) \cdot W^g \quad (5)$$

Here, the subscript m refers to the $m^{th}$ one of the M attention heads 308a-308c, so $Q_m$ refers to the $m^{th}$ vector of the query matrix, Km refers to the $m^{th}$ vector of the key matrix, and $V_m$ refers to the $m^{th}$ vector of the value matrix. Also, $W_m^q$, $W_m^k$, and $W_m^v$ respectively represent portions of learnable matrices that are used by the linear transformation functions 304a-304c to generate the $m^{th}$ vectors of the query, key, and value matrices. Further, $A_m$ represents a global attention map generated using the $m^{th}$ vector of the query matrix and the $m^{th}$ vector of the key matrix, and $d_m$ represents the dimension of the $m^{th}$ vector of the query matrix. Moreover, $O_{gm}$ represents a global output representation 312 generated using the global attention map $A_m$ and the $m^{th}$ vector of the value matrix. In addition, concat($O_{g1}, \ldots, O_{gM}$) represents the combined global output representation 316 generated by the concatenation function 314, $W^g$ represents the learnable matrix that is used by the linear transformation function 318, and $Y^g$ represents the global representation 320 of the input video data 202 and/or the input audio data 204.

Note that the global representation 320 of the input video data 202 and/or the input audio data 204 is determined for a global context, which means the global representation 320 can be susceptible to erroneous variations in global attention profiles. Thus, the architecture 300 also supports the determination of local attention within different temporal segments of the input video data 202 and/or the input audio data 204. In FIG. 3, this is supported using a time split function 322, which operates to split each attention head 308a-308c into multiple segments or chunks 324 over time. For example, in some embodiments, the time split function 322 can divide each of the attention heads 308a-308c into multiple chunks 324 of equal or substantially equal sizes. Using the same example from above, each attention head 308a-308c can be split by dividing its T×(D/M) matrix into N chunks 324, so each chunk 324 would have a size of (T/N)×(D/M). In some cases, the chunks 324 for each attention head 308a-308c may represent non-overlapping chunks. Here, there are multiple chunks 324 for each attention head 308a containing part of the query matrix, multiple chunks 324 for each attention head 308b containing part of the key matrix, and multiple chunks 324 for each attention head 308c containing part of the value matrix.

The chunks 324 are provided to a multi-head self-attention function 326, which can perform similar operations as the self-attention function 310 (but with chunks 324 of the attention heads 308a-308c rather than with the complete attention heads 308). The self-attention function 326 uses the chunks 324 to generate local attention maps and uses the local attention maps to generate local output representations 328 associated with the inputs 302. Note that multiple local attention maps and multiple associated local output representations 328 can be generated for each collection of (i) an attention head 308a from the first linear transformation function 304a, (ii) the associated attention head 308b from the second linear transformation function 304b, and (iii) the associated attention head 308c from the third linear transformation function 304c. This results in multiple collections of local output representations 328, where each collection contains multiple local output representations 328 that are generated using the same attention heads 308a-308c used to generate one of the global output representations 312. That is, each global output representation 312 is generated using one attention head 308a, one attention head 308b, and one attention head 308c, and the same three attention heads 308a-308c are used to generate multiple local output representations 328 (one for each chunk 324 of the attention head 308a, 308b, or 308c).

The collections of local output representations 328 are concatenated or otherwise combined using a concatenation function 330, which generates a context-aware combined local output representation 332 of the inputs 302. The combined local output representation 332 is provided to a linear transformation function 334, which operates to transform the combined local output representation 332 into a local representation 336 of the input video data 202 and/or the input audio data 204. This may be accomplished, for example, by having the linear transformation function 334 multiply the combined local output representation 332 with a learnable matrix (which can differ from the learnable matrix used by the linear transformation function 318). This process generally allows the local representation 336 to represent how different features 208, 212 contained in the inputs 302 are related to one another in different portions of the input video data 202 and/or the input audio data 204 (rather than in the entirety of the input video data 202 and/or the input audio data 204).

In some embodiments, the determination and use of local attention can be expressed as follows. The time split function 322 divides each attention head 308a-308c into multiple chunks 324. These chunks 324 are processed using the self-attention function 326 to generate the local output representations 328, which are combined and processed to generate the local representation 336. The operations of the self-attention function 326, the concatenation function 330, and the linear transformation function 334 can be expressed as follows.

$$O_{n,m} = \text{softmax}\left(\frac{Q_{n,m} K_{n,m}^T}{\sqrt{d_m}}\right) \cdot V_{n,m} \quad (6)$$

$$O_{lm} = \text{concat}(O_{1,m}, \ldots, O_{N,m}) \quad (7)$$

$$Y^l = \text{concat}(O_{l1}, \ldots, 0_{lM}) \cdot W^l \quad (8)$$

Here, the subscript n refers to the $n^{th}$ one of N chunks 324 for each attention head 308a-308c, so $Q_{n,m}$ refers to the $n^{th}$ chunk of the $m^{th}$ vector of the query matrix, $K_{n,m}$ refers to the $n^{th}$ chunk of the $m^{th}$ vector of the key matrix, and $V_{n,m}$ refers to the $n^{th}$ chunk of the $m^{th}$ vector of the value matrix. Also, $O_{n,m}$ represents a local attention map generated using the $n^{th}$ chunk of the $m^{th}$ vector of the query matrix and the $n^{th}$ chunk of the $m^{th}$ vector of the key matrix. Moreover, $O_{lm}$ represents a local output representation 328 generated for the $m^{th}$ vectors of the query, key, and value matrices using all N chunks 324, which is generated using the N attention maps generated using those chunks 324. In addition, W represents the learnable matrix that is used by the linear transformation function 334, and i represents the local representation 336 of the input video data 202 and/or the input audio data 204.

In the architecture 300 of FIG. 3, the global representation 320 and the local representation 336 of the input video data 202 and/or the input audio data 204 are combined using a gating mechanism, which uses the multi-level output representations as inputs and determines weights to be given to the global and local representations. Here, the gating mechanism includes two additional linear transformation functions 338 and 340, which respectively operate to transform the combined global output representation 316 and the combined local output representation 332 into a global relevance 342 and a local relevance 344. The global relevance 342 may represent a weight matrix that is associated with the global representation 320 and that represents the relative importance of the global representation 320. The local relevance 344 may represent a weight matrix that is associated with the local representation 336 and that represents the relative importance of the local representation 336.

The global relevance 342 and the local relevance 344 are respectively provided to sigmoid functions 346 and 348, which remap the global relevance 342 and the local relevance 344 using respective curves to generate a mapped global relevance 350 and a mapped local relevance 352. The mapped global relevance 350 and mapped local relevance 352 are provided to a softmax function 354, which generates a global weight matrix 356 and a local weight matrix 358. A multiplier 360 multiplies the global representation 320 with the global weight matrix 356 to generate a weighted global representation 362 of the input video data 202 and/or the input audio data 204. A multiplier 364 multiplies the local representation 336 with the local weight matrix 358 to generate a weighted local representation 366 of the input video data 202 and/or the input audio data 204. A combiner 368 adds or otherwise combines the weighted global representation 362 and the weighted local representation 366 to generate a final output representation 370 of the input video data 202 and/or the input audio data 204. The final output representation 370 may be provided to the classifier function 218 or other destination(s) for further processing or use.

In some embodiments, the determination of the final output representation 370 can be expressed as follows. The global and local representations 320, 336 are generated as described above, and the associated combined global output representation 316 and combined local output representation 332 are processed with the linear transformation functions 338 and 340 using learnable matrices. Here, each time frame of the input audio/video data can be weighted locally as well as globally while making predictions. The outputs of the linear transformation functions 338 and 340 are further processed in order to determine how much weight should be given to global attention characteristics and how much weight should be given to local attention characteristics. The operations of the gating mechanism can be expressed as follows.

$$R^g = \mathrm{concat}(O_{g1}, \ldots, O_{gM}) \cdot W_g^g \quad (9)$$

$$R^l = \mathrm{concat}(O_{l1}, \ldots, O_{lM}) \cdot W_g^l \quad (10)$$

$$R^g, R^l = \mathrm{softmax}([R^g, R^l]) \quad (11)$$

$$Y = R^g \odot Y^g + R^l \odot Y^l \quad (12)$$

Here, $R^g$ and $R^l$ respectively represent the global relevance 342 and the local relevance 344 (or the mapped global relevance 350 and the mapped local relevance 352). Also, $W_g^g$ and $W_g^l$ respectively represent the learnable matrices that are used by the linear transformation functions 338 and 340. In addition, Y represents the final output representation 370.

As can be seen here, the self-attention function 310 may only take into account global context (meaning context across an entire audio/video input), while the self-attention function 326 may consider local context (meaning context within different portions of the audio/video input). Since the softmax function 354 can be calculated over a period of time associated with the chunks 324 ($T_N$) that is smaller than the length of the audio/video input (T), the softmax function 354 provides additional information about how one time frame of the input is perceived in relation to a local context (rather than to the entire global context). This additional information is complimentary to the global-level context and improves the ability of the architecture 300 to accurately generate output representations 370 that can be further processed.

As noted above, in some cases, the architecture 300 shown here can be trained using a temporal adversarial training scheme in which the architecture 300 is trained to be robust to adversarial examples at two levels (the attention level and the output level). This means that the architecture 300 is trained to not only generate correct final output representations 370 based on training data but also to generate correct global output representations 312 and local output representations 328 based on the training data.

For training deep neural network models for classification tasks, a cross-entropy loss function is widely used. This loss function can be defined as:

$$\mathcal{L}_{CE} = \frac{1}{L} \sum_{i=1}^{L} l(y_i, \theta(X_i)) = \qquad (13)$$
$$\frac{1}{L} \sum_{i=1}^{L} \frac{1}{K} \sum_{k=1}^{K} -y_{ik} \log(\theta(X_i)_k) - (1 - y_{ik}) \log(1 - \theta(X_i)_k)$$

Here, for the $i^{th}$ training data point, X, represents a feature matrix (an input 302 containing features 208, 212 representing the training data point), $\theta(X_i)$ represents a model output (a final output representation 370 generated based on this training data point), and $y_i$ represents a ground-truth label for this training data point. Also, L represents a number of training samples, K represents a number of classes, and $l(y_i, \theta(X_i))$ represents a cross-entropy loss function. The overall loss here is denoted $\mathcal{L}_{CE}$ and represents a measure of cross-entropy loss for the training data. Often times, a machine learning model (such as the architecture 300) can be trained to minimize the cross-entropy loss. However, this approach leaves the trained model prone to adversarial attacks, which means minor imperceptible changes in input content can lead to dramatic changes in the model's output predictions.

Adding a small amount of noise to the training data (possibly imperceptible to humans) can lead to significantly different and incorrect predictions by a machine learning model. This forces the machine learning model to learn a non-smooth manifold that also reduces the generalizability of the model. To counter this problem, adversarial training of models can be performed using an adversarial cross-entropy loss function $\mathcal{L}_{Adv}$. To accomplish this, adversarial examples are generated while training based on current model parameters, and the model is trained to correctly classify these adversarial examples along with the original training samples. Training a machine learning model with the resultant loss function $\mathcal{L}_{Adv}$ enforces that the model's output is invariant to adversarial perturbations. This can be expressed as follows.

$$\mathcal{L}_{Adv} = \mathcal{L}_{CE} + \alpha \frac{1}{L}\sum_{i=1}^{L} l(y_i, \theta(X_i + R_i)) \quad (14)$$

$$R_i = \epsilon \frac{G_i}{\|G_i\|_2}, \text{ where } G_i = \nabla x_i l(y_i, \theta(X_i)) \quad (15)$$

Here, $R_i$ represents a perturbation term that generates an adversarial counterpart for training sample $X_i$. Also, a represents a weight given to the adversarial regularization term in order to calculate the adversarial loss $\mathcal{L}_{Adv}$, and s represents a hyper-parameter that determines the magnitude of the perturbation. In this example, $R_i$ is determined using a gradient $G_i$ of the cross-entropy loss with respect to the training sample $X_i$, although other approaches may be used here.

While adversarial training is useful for training a machine learning model to process individual images, this training approach may not be easily applied to audio/video classification. In the context of this patent document, generating adversarial examples using individual images may not help train the architecture 300 to properly identify global and local contexts using self-attention. In order to increase the robustness of attention-based models, it is possible to make at least some of the attention maps created by the self-attention function 310 and/or the self-attention function 326 generally invariant to adversarial examples. To do this, the loss computation function 224 can use a cross-entropy loss function that is based on an average across the heads 308a-308c used by the self-attention function 310 or the self-attention function 326 for each training sample and for its adversarial counterpart (denoted $A_i$ and $A_i^{Adv}$, respectively), and a regularization term can be applied to the difference between $A_i$ and $A_i^{Adv}$. In some cases, the regularization term may be based on a distance measure and/or a divergence measure between the attention maps generated for each training sample and its adversarial counterpart. As particular examples, the regularization term may be based on a Frobenius norm of the differences between the attention maps generated by the model for the training samples and their adversarial counterparts, a Kullback-Leibler divergence between attention profiles of the attention maps generated by the model for the training samples and their adversarial counterparts, a Jensen-Shannon divergence between the attention profiles, or a Wasserstein distance between the attention profiles. Using the Frobenius norm, for instance, a new loss function used by the loss computation function 224 to train the architecture 300 may be defined as follows.

$$\mathcal{L}_{AdvFR} = \mathcal{L}_{Adv} + \beta_{Fr}\frac{1}{L}\sum_{i=1}^{L} \|A_i - A_i^{Adv}\|_{Fr} \quad (16)$$

Similar loss functions may be defined for other regularization terms described above. Note that the $A_i$ and $A_i^{Adv}$ terms here may refer to the attention maps generated by the self-attention function 310, although a similar term may be used to consider the attention maps generated by the self-attention function 326 (instead of or in addition to the attention maps generated by the self-attention function 310).

Using this type of loss function, the following algorithm may be used to train the architecture 300. Here, the architecture 300 is referred to as a GAT, meaning the architecture 300 includes a gated adversarial transformer-based architecture. Also, MLP is used here to refer to multi-layer perceptron. Note that while the Frobenius norm is used in this example, nothing prevents other regularization terms from being used in this algorithm.

---

Algorithm 1: Training GAT with Frobenius attention map regularization given input audio-visual features ($X_v$, $X_a$), ground truth labels y, loss function l, gated multi-level attention based Transformer encoder blocks $\theta_v^{enc}$ and $\theta_a^{enc}$ for the two modalities. MLP parameters $\theta_{MLP}$, some radius $\epsilon$, hyper-parameters $\alpha$ and $\beta_{Fr}$, learning, rate $\eta$ for E epochs with mini-batch size B Function Update $\theta_v^{enc}$, $\theta_a^{enc}$ and $\theta_{MLP}$
  Initialise $\theta_v^{enc}$, $\theta_q^{enc}$ and $\theta_{MLP}$
  for e = 1 . . . E do
    for b =1 . . . B do
      $\hat{y}_b = \theta_{MLP}(\theta_v^{enc}(X_{b,v}), \theta_a^{enc}(X_{b,a}))$
      $L_{CE} = l(y_b, \hat{y}_b)$
      for m in {a, v} do $$R_{b,m} = \epsilon\frac{\nabla x_{b,m}L_{CE}}{\|\nabla x_{b,m}L_{CE}\|_2}$$

$R_{b,m}$ = stop_gradient ($R_{b,m}$)
      $X_{b,m}^{ad} = X_{b,m} + R_{b,m}$
      $A_{b,m}$ = get_att($\theta_m^{enc}$, $X_{b,m}$)
      $A_{b,m}^{ad}$ = get_att($\theta_m^{enc}$, $X_{b,m}^{ad}$)
    $L_F = \|A_{b,v} - A_{b,v}^{ad}\| + \|A_{b,a} - A_{b,a}^{ad}\|$
    $\hat{y}_b^{ad} = \theta_{MLP}(\theta_v^{enc}(X_{b,v}^{ad}), \theta_a^{enc}(X_{b,a}^{ad}))$
    $L_{CE}^{ad} = l(y_b, \hat{y}_b^{ad})$
    $L = L_{CE} + \alpha * L_{CE}^{ad} + \beta_{Fr} * L_F$
    $\theta_v^{enc} = \theta_v^{enc} - \eta * \nabla_{\theta_v^{enc}} L$
    $\theta_a^{enc} = \theta_a^{enc} - \eta * \nabla_{\theta_a^{enc}} L$
    $\theta_{MLP} = \theta_{MLP} - \eta * \nabla_{\theta_{MLP}} L$
  return $\theta_v^{enc}$, $\theta_a^{enc}$ and $\theta_{MLP}$

---

Note that the operations and functions described above with reference to FIG. 3 can be implemented in an electronic device 101, 102, 104, server 106, or other device in any suitable manner. For example, in some embodiments, the operations and functions described above with reference to FIG. 3 can be implemented or supported using one or more software applications or other software instructions that are executed by at least one processor 120 of a device. In other embodiments, at least some of the operations and functions described above with reference to FIG. 3 can be implemented or supported using dedicated hardware components. In general, the operations and functions described above with reference to FIG. 3 can be performed using any suitable hardware or any suitable combination of hardware and software/firmware instructions.

Although FIG. 3 illustrates one example of an architecture 300 supporting gated multi-level attention in a machine learning model 214 for audio/video understanding, various changes may be made to FIG. 3. For example, any suitable transformations may be used to convert data in the architecture 300. Also, any other suitable gating mechanism may be used in the architecture 300.

Figure 4:
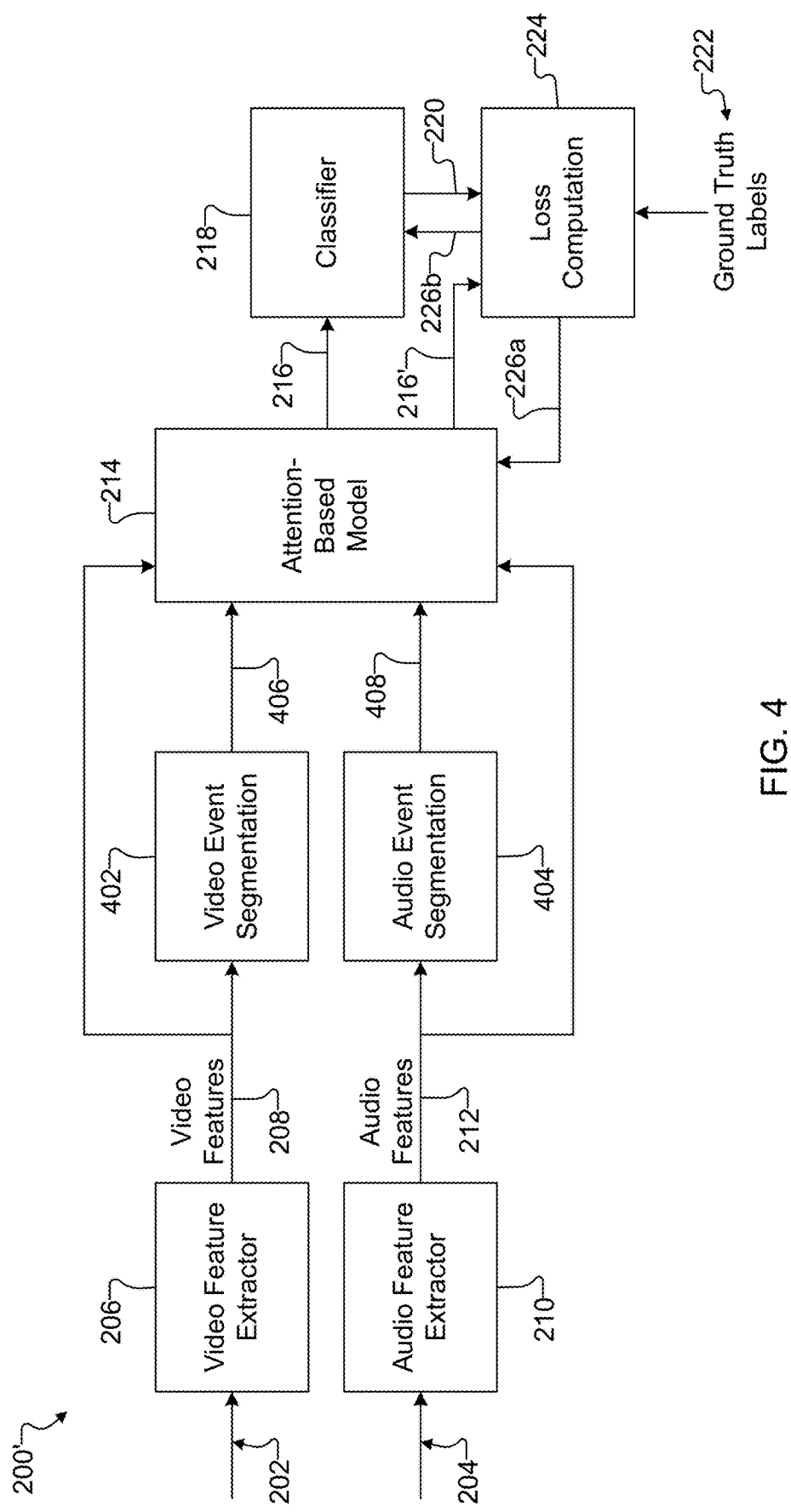
FIG. 4 illustrates a second example architecture for training a machine learning model based on gated multi-level attention and temporal adversarial training and for using the machine learning model to perform audio/video understanding in accordance with this disclosure.

FIG. 4 illustrates a second example architecture 200' for training a machine learning model based on gated multi-level attention and temporal adversarial training and for using the machine learning model to perform audio/video understanding in accordance with this disclosure. The architecture 200' here is similar to the architecture 200 shown in FIG. 2. However, in this example, a video event segmentation function 402 is provided to analyze the video features 208, and an audio event segmentation function 404 is provided to analyze the audio features 212. As noted above, only video data or only audio data may be received, so only one of the event segmentation functions 402, 404 may be needed depending on the circumstances.

The video event segmentation function 402 identifies times when the features 208 of the input video data 202 change significantly, such as when differences between the features 208 of two image frames in the input video data 202 differ by more than a threshold. The audio event segmentation function 404 similarly identifies times when the features 212 of the input audio data 204 change significantly. These significant changes in the features 208, 212 can be respectively used as indicators 406, 408 of different starting or ending points of different events within the input data. Rather than dividing the attention heads 308a-308c into evenly-sized chunks 324 or substantially evenly-sized chunks 324, these starting or ending points can be used to divide the attention heads 308a-308c into chunks 324, where the chunks 324 are identified based on the event segmentation boundaries. In these embodiments, the chunks 324 can be associated with events of equal or different lengths, and the local attention operations in the architecture 300 may use these chunks 324 when performing the local attention operations. Each event segmentation function 402, 404 represents any suitable logic configured to identify changes in audio/video features, such as an unsupervised event segmentation algorithm.

This approach may be beneficial in various circumstances since it can help to ensure that local relevance of audio/video data is based on an event cluster in which the data belongs (rather than determining a local window in a fixed manner). For example, in some embodiments, a one hundred-second video sequence may be divided into ten non-overlapping chunks 324. In other embodiments, the same one hundred-second video sequence may be divided into a different number of chunks 324 (possibly with different lengths) based on the events actually occurring within the video sequence.

Although FIG. 4 illustrates a second example of an architecture 200' for training a machine learning model 214 based on gated multi-level attention and temporal adversarial training and for using the machine learning model 214 to perform audio/video understanding, various changes may be made to FIG. 4. For example, a device that uses the trained attention-based machine learning model 214 and the classifier function 218 during inferencing may lack a loss computation function 224.

Figure 5A:
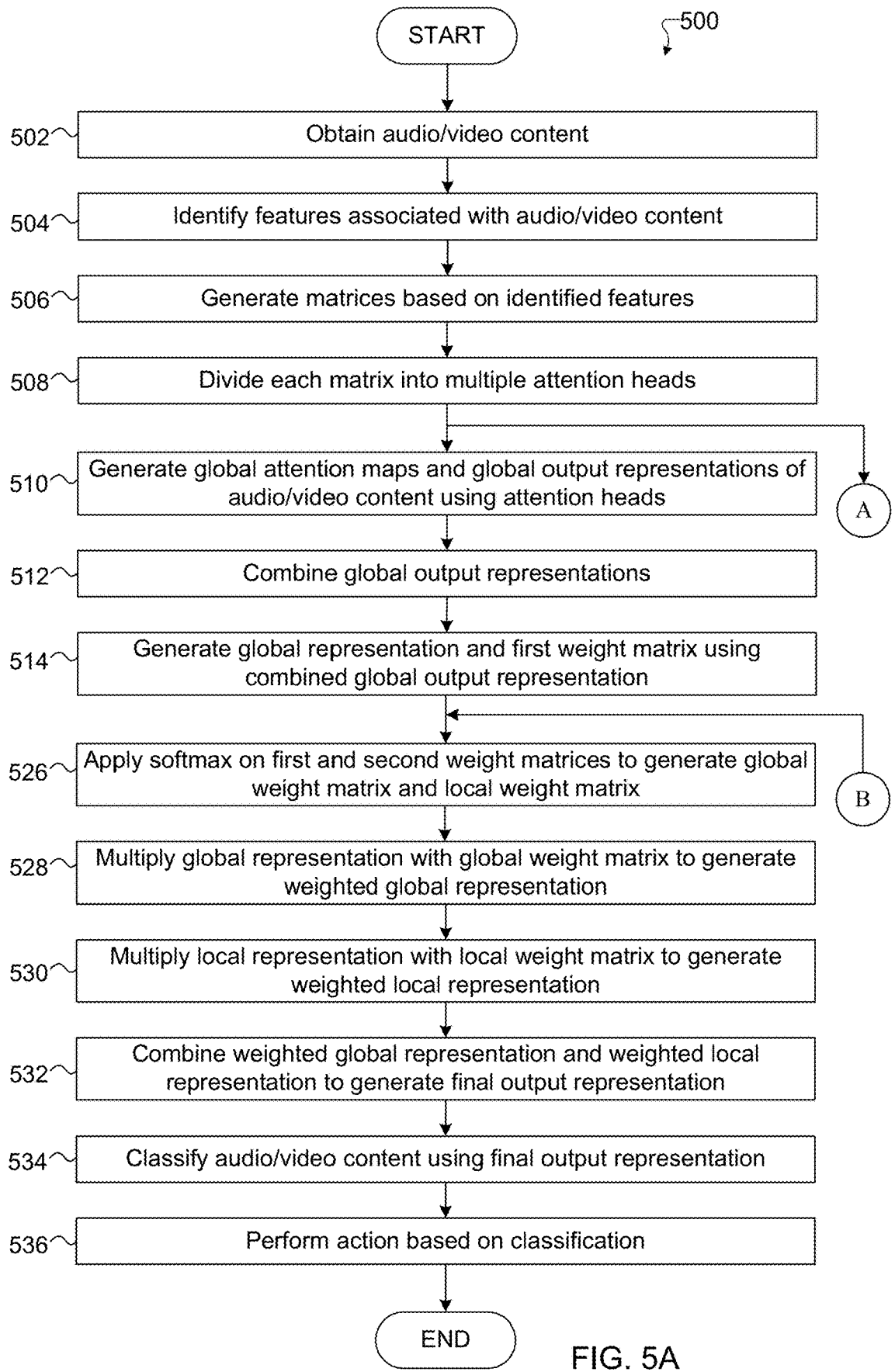
FIGS. 5A and 5B illustrate an example method for using a machine learning model to perform audio/video understanding based on gated multi-level attention in accordance with this disclosure.
Figure 5B:
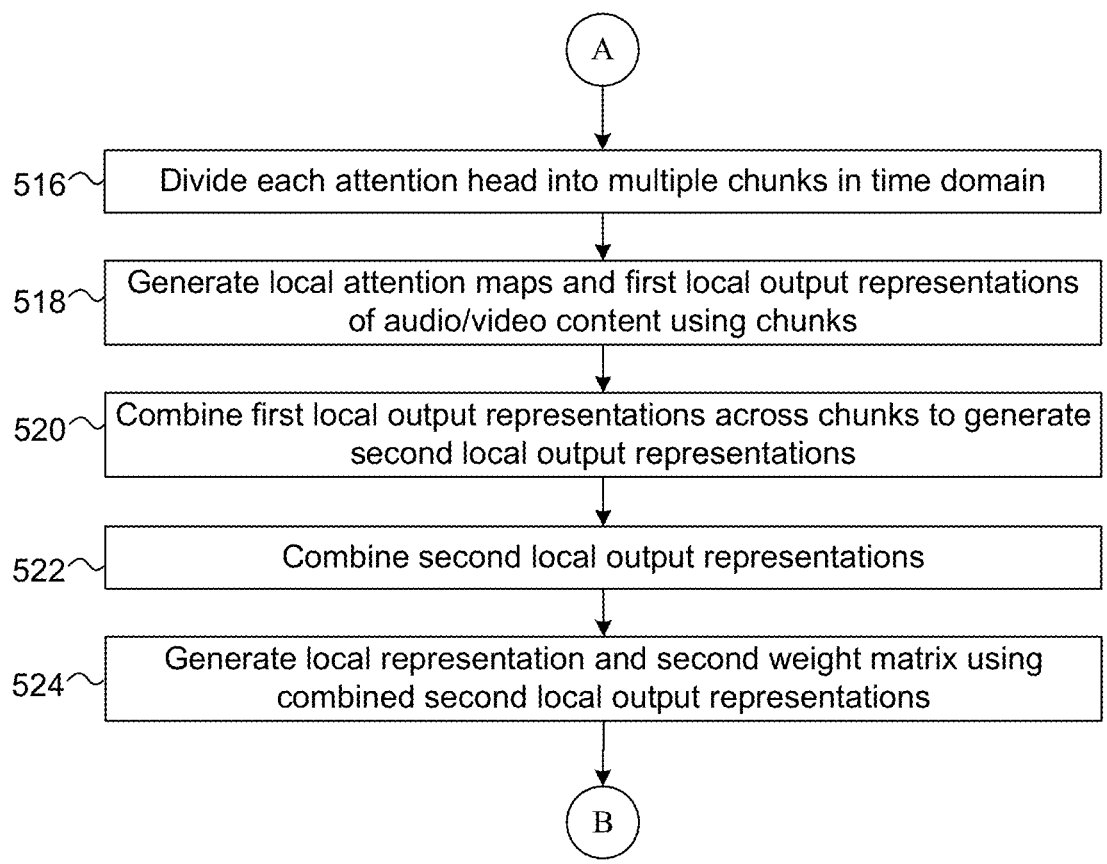

FIGS. 5A and 5B illustrate an example method 500 for using a machine learning model to perform audio/video understanding based on gated multi-level attention in accordance with this disclosure. For ease of explanation, the method 500 may be performed by the processor 120 of the electronic device 101 and/or the server 106 in the network configuration 100 of FIG. 1 using the architecture 200 or 200' of FIG. 2 or 4 with a machine learning model 214 having the architecture 300 of FIG. 3. However, the method 500 may be performed using any other suitable device and in any other suitable system with any other suitable machine learning model architecture.

As shown in FIG. 5A, audio/video content is obtained at step 502. This may include, for example, the processor 120 obtaining the input video data 202 and/or the input audio data 204 from any suitable source. Steps 504-536 generally represent a process for processing the audio/video content with a trained attention-based machine learning model to classify the audio/video content. Here, this process generally involves generating a global representation of the audio/video content based on the audio/video content, generating a local representation of the audio/video content based on different portions of the audio/video content, and combining the global representation of the audio/video content and the local representation of the audio/video content to generate an output representation of the audio/video content.

Features associated with the audio/video content are identified at step 504. This may include, for example, the processor 120 using the video feature extractor 206 to generate video features 208 representing the input video data 202 and/or using the audio feature extractor 210 to generate audio features 212 representing the input audio data 204. Multiple matrices are generated based on the identified features at step 506. This may include, for example, the processor 120 using the linear transformation functions 304a-304c to convert an input matrix containing the features 208, 212 into transformed outputs 306a-306c, such as query, key, and value matrices. Each matrix is divided into multiple attention heads at step 508. This may include, for example, the processor 120 dividing rows or vectors of the query matrix into attention heads 308a, rows or vectors of the key matrix into attention heads 308b, and rows or vectors of the value matrix into attention heads 308c.

At this point, global attention processing and local attention processing may occur in parallel using the attention heads (although this need not be the case). As shown in FIG. 5A, the global attention processing includes generating global attention maps and global output representations of the audio/video content using the attention heads at step 510. This may include, for example, the processor 120 using the self-attention function 310 to generate global attention maps using the attention heads 308a and 308b (corresponding to the query and key vectors) and to generate global output representations 312 using the global attention maps and the attention heads 308c (corresponding to the value vectors). The global output representations are combined to produce a combined global output representation at step 512. This may include, for example, the processor 120 using the concatenation function 314 to generate a combined global output representation 316. A global representation of the audio/video content and a first weight matrix are generated using the combined global output representation at step 514. This may include, for example, the processor 120 using the linear transformation function 318 to transform the combined global output representation 316 into a global representation 320. This may also include the processor 120 using the linear transformation function 338 to transform the combined global output representation 316 into a global relevance 342 representing a weight matrix.

As shown in FIG. 5B, the local attention processing includes dividing each attention head into multiple chunks in the time domain at step 516. This may include, for example, the processor 120 using the time split function 322 to divide each attention head 308a-308c into multiple chunks 324. In some cases, the chunks 324 may be even or substantially even in size/length. In other cases, the chunks 324 may be defined based on indicators 406, 408 from the event segmentation functions 402, 404. Local attention maps and first local output representations of different portions of the audio/video content are generated using the chunks at step 518. This may include, for example, the processor 120 using the self-attention function 326 to generate local attention maps using the chunks 324 of the attention heads 308a and 308b (corresponding to the query and key vectors) and to generate first local output representations using the local attention maps and the chunks 324 of the attention heads 308c (corresponding to the value vectors). The first local output representations are combined across the chunks to generate second local output representations at step 520. This may include, for example, the processor 120 using the self-attention function 326 to combine the first local output representations associated with the same attention heads 308a-308c to generate second local output representations 328. The second local output representations are combined to produce a combined local output representation at step 522. This may include, for example, the processor 120 using the concatenation function 330 to generate a combined local output representation 332. A local representation of the audio/video content and a second weight matrix are generated using the combined local output representation at step 524. This may include, for example, the processor 120 using the linear transformation function 334 to transform the combined local output representation 332 into a local representation 336. This may also include the processor 120 using the linear transformation function 340 to transform the combined local output representation 332 into a local relevance 344 representing another weight matrix.

Returning to FIG. 5A, a gating mechanism is used to combine the global representation 320 and the local representation 336 into a final representation of the audio/video content. In this example, a softmax operation is applied to the first and second weight matrices to generate a global weight matrix and a local weight matrix at step 526. This may include, for example, the processor 120 applying the softmax function 354 to the weight matrices (as processed by the sigmoid functions 346 and 348) to generate the global weight matrix 356 and the local weight matrix 358. The global representation is multiplied by the global weight matrix to generate a weighted global representation at step 528, and the local representation is multiplied by the local weight matrix to generate a weighted local representation at step 530. This may include, for example, the processor 120 using the multipliers 360 and 364 to generate the weighted global representation 362 and the weighted local representation 366. The weighted representations are combined to generate a final output representation of the audio/video content at step 532. This may include, for example, the processor 120 using the combiner 368 to add or otherwise combine the weighted global representation 362 and the weighted local representation 366 to generate a final output representation 370.

The final output representation of the audio/video content may be used in any suitable manner. For example, the final output representation may be used to classify the audio/video content (or portions thereof) at step 534. This may include, for example, the processor 120 using the classifier function 218 to classify the audio/video content (or portions thereof). One or more actions may be performed based on the classification at step 536. This may include, for example, the processor 120 recommending or providing additional audio/video content to a user, such as additional audio/video content recommended for the user based on the user's history or additional advertisements that might be of interest to the user.

Although FIGS. 5A and 5B illustrate one example of a method 500 for using a machine learning model to perform audio/video understanding based on gated multi-level attention, various changes may be made to FIGS. 5A and 5B. For example, while shown as including serial and parallel steps, various steps in FIGS. 5A and 5B may occur serially or in parallel different from what is shown here, occur in a different order, or occur any number of times.

Figure 6:
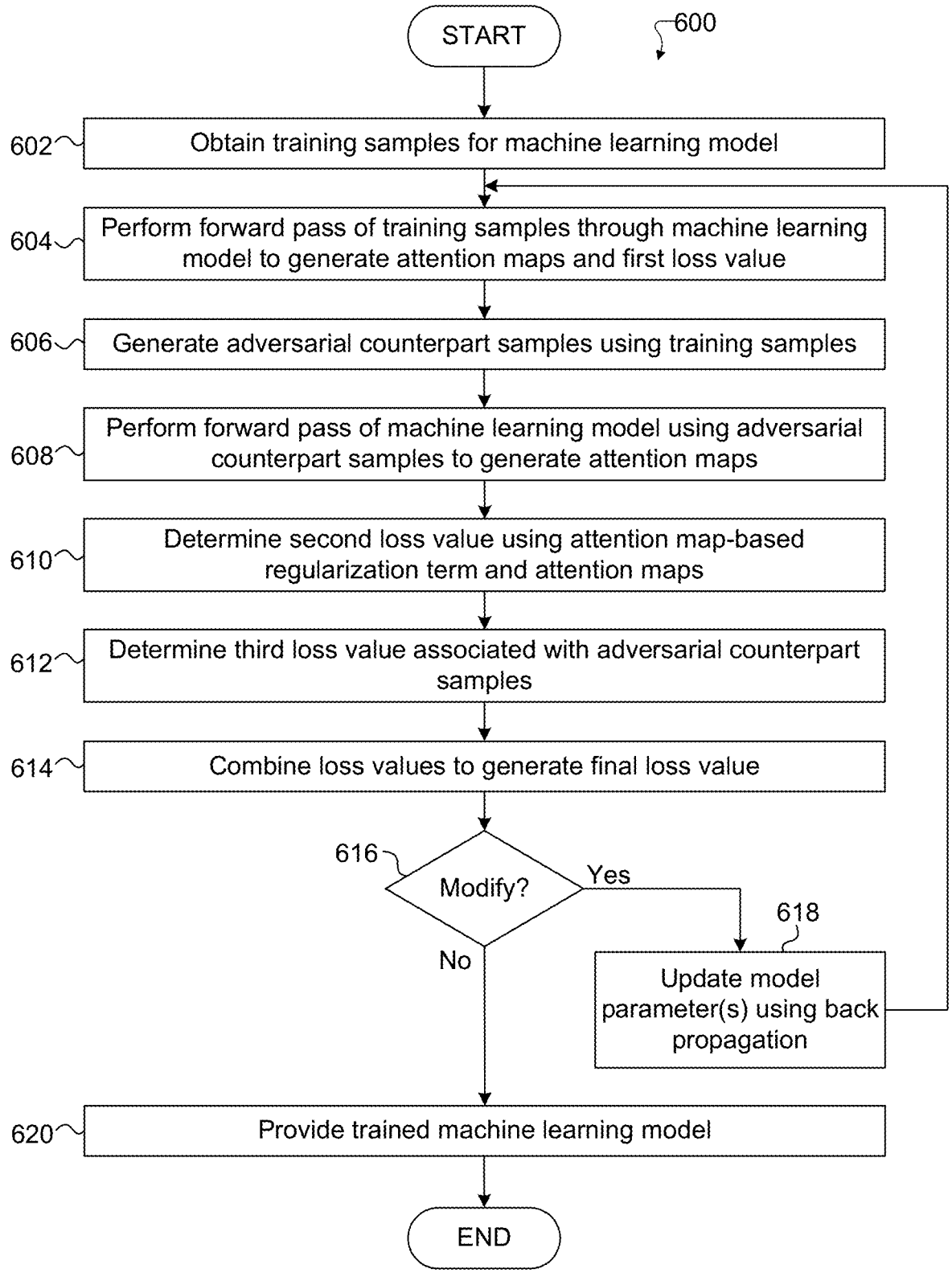
FIG. 6 illustrates an example method for training a machine learning model based on temporal adversarial training in accordance with this disclosure.

FIG. 6 illustrates an example method 600 for training a machine learning model based on temporal adversarial training in accordance with this disclosure. For ease of explanation, the method 600 may be performed by the processor 120 of the electronic device 101 and/or the server 106 in the network configuration 100 of FIG. 1 to train the machine learning model 214 having the architecture 300 of FIG. 3, which can be used in the architecture 200 or 200' of FIG. 2 or 4. However, the method 600 may be performed using any other suitable device and in any other suitable system with any other suitable machine learning model architecture.

As shown in FIG. 6, training samples for a machine learning model are obtained at step 602. This may include, for example, the processor 120 obtaining input data 202 and 204 (or the extracted features 208 and 212) representing known training samples and associated ground truth labels 222. A forward pass of the training samples through the machine learning model is performed to generate attention maps and a first loss value associated with the training samples at step 604. This may include, for example, the processor 120 passing the training samples through the machine learning model 214 and using the results to calculate a cross-entropy loss value $\mathcal{L}_{CE}$ associated with the training samples. In some cases, this may be performed for both audio and video training samples. The attention maps generated here can be saved for later use.

Adversarial counterpart samples are generated using the training samples at step 606. This may include, for example, the processor 120 generating adversarial counterpart samples based on gradients of the cross-entropy loss with respect to the training samples. A forward pass of the adversarial counterpart samples through the machine learning model is performed to generate attention maps associated with the adversarial counterpart samples at step 608. This may include, for example, the processor 120 passing the adversarial counterpart samples through the machine learning model 214. The attention maps generated here can also be saved for later use. Again, in some cases, this may be performed for both audio and video training samples.

A second loss value is generated based on an attention map-based regularization term using the generated attention maps at step 610. This may include, for example, the processor 120 determining a Frobenius norm, a Kullback-Leibler divergence, a Jensen-Shannon, or a Wasserstein distance based on the attention maps generated using the training samples and the attention maps generated using the adversarial counterpart samples. A third loss value associated with the adversarial counterpart samples is determined at step 612. This may include, for example, the processor 120 using the results generated by the machine learning model 214 using the adversarial counterpart samples to calculate a cross-entropy loss value $\mathcal{L}_{CE}^{ad}$ associated with the adversarial counterpart samples. Again, in some cases, this may be performed for both audio and video adversarial counterpart samples. A final loss value is determined by combining the first, second, and third loss values at step 614.

A determination is made whether modification of the machine learning model is needed at step 616. This may include, for example, the processor 120 determining whether the final loss value is below a threshold, which may indicate that the machine learning model 214 has been trained to an acceptable accuracy. This may also include the processor 120 determining whether a threshold amount of training time has already elapsed or whether a threshold number of iterations through the training process have occurred, which may indicate that training of the machine learning model 214 should cease. If the machine learning model is to be modified, one or more parameters of the machine learning model are modified using back propagation at step 618. This may include, for example, the processor 120 performing back propagation to modify one or more parameters of the attention-based machine learning model 214. Ideally, the one or more modified parameters of the machine learning model 214 will reduce the final loss value. Another training iteration occurs by returning to step 604 and using the modified machine learning model 214. At some point, the machine learning model can be output as a trained machine learning model at step 620. This may include, for example, the processor 120 using the trained machine learning model 214 or providing the trained machine learning model 214 to at least one other device for use.

Although FIG. 6 illustrates one example of a method 600 for training a machine learning model 214 based on temporal adversarial training, various changes may be made to FIG. 6. For example, while shown as including serial steps, various steps in FIG. 6 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
    obtaining, using at least one processor, audio/video content; and
    processing, using the at least one processor, the audio/video content with a trained attention-based machine learning model to classify the audio/video content;
    wherein processing the audio/video content comprises, using the trained attention-based machine learning model:
        generating a global representation of the audio/video content based on the audio/video content;
        generating a local representation of the audio/video content based on different portions of the audio/video content; and
        combining the global representation of the audio/video content and the local representation of the audio/video content to generate an output representation of the audio/video content, the audio/video content classified based on the output representation.

2. The method of claim 1, further comprising:
    generating multiple matrices based on the audio/video content; and
    dividing each of the multiple matrices into multiple attention heads;
    wherein the global and local representations of the audio/video content are based on the attention heads.

3. The method of claim 2, wherein generating the global representation of the audio/video content comprises:
    for each of multiple collections of attention heads, using the attention heads to generate a global attention map and generate a global output representation of the audio/video content based on the global attention map;
    combining the global output representations of the audio/video content across the collections of attention heads to generate a combined global output representation of the audio/video content;
    multiplying the combined global output representation of the audio/video content with a first learnable matrix to generate the global representation of the audio/video content; and
    multiplying the combined global output representation of the audio/video content with a second learnable matrix to generate a first weight matrix.

4. The method of claim 3, wherein generating the local representation of the audio/video content comprises:
    for each of the multiple collections of attention heads:
        dividing each of the attention heads into multiple chunks in a temporal domain, the chunks of each attention head associated with the different portions of the audio/video content;
        using the chunks of the attention heads to generate local attention maps and generate first local output representations of the different portions of the audio/video content based on the local attention maps; and
        combining the first local output representations across the temporal domain to generate a second local output representation of the audio/video content;
    combining the second local output representations of the audio/video content across the collections of attention heads to generate a combined local output representation of the audio/video content;
    multiplying the combined local output representation of the audio/video content with a third learnable matrix to generate the local representation of the audio/video content; and
    multiplying the combined local output representation of the audio/video content with a fourth learnable matrix to generate a second weight matrix.

5. The method of claim 4, wherein combining the global representation of the audio/video content and the local representation of the audio/video content to generate the output representation of the audio/video content comprises:
    using the first and second weight matrices to generate a global weight matrix for the global representation of the audio/video content and a local weight matrix for the local representation of the audio/video content;
    multiplying the global representation of the audio/video content with the global weight matrix to generate a weighted global representation of the audio/video content;
    multiplying the local representation of the audio/video content with the local weight matrix to generate a weighted local representation of the audio/video content; and
    combining the weighted global representation of the audio/video content and the weighted local representation of the audio/video content to generate the output representation of the audio/video content.

6. The method of claim 1, wherein:
    the audio/video content comprises first content provided to a user; and
    the method further comprises identifying or providing second content to the user based on a classification of the audio/video content.

7. The method of claim 1, wherein the different portions of the audio/video content have different lengths.

8. The method of claim 1, wherein the trained attention-based machine learning model is trained by:
    obtaining training samples;
    generating adversarial counterpart samples for the training samples; and
    training the attention-based machine learning model using the training samples and the adversarial counterpart samples to (i) reduce or minimize differences between attention maps generated by the attention-based machine learning model for the training samples and the adversarial counterpart samples and (ii) reduce or minimize differences between output representations generated by the attention-based machine learning model for the training samples and the adversarial counterpart samples.

9. An apparatus comprising:
at least one processor configured to:
  obtain audio/video content; and
  process the audio/video content with a trained attention-based machine learning model to classify the audio/video content;
wherein, to process the audio/video content, the at least one processor is configured to use the trained attention-based machine learning model to:
  generate a global representation of the audio/video content based on the audio/video content;
  generate a local representation of the audio/video content based on different portions of the audio/video content; and
  combine the global representation of the audio/video content and the local representation of the audio/video content to generate an output representation of the audio/video content, the audio/video content classified based on the output representation.

10. The apparatus of claim 9, wherein the at least one processor is further configured to:
generate multiple matrices based on the audio/video content; and
divide each of the multiple matrices into multiple attention heads, the global and local representations of the audio/video content based on the attention heads.

11. The apparatus of claim 10, wherein, to generate the global representation of the audio/video content, the at least one processor is configured to:
for each of multiple collections of attention heads, use the attention heads to generate a global attention map and generate a global output representation of the audio/video content based on the global attention map;
combine the global output representations of the audio/video content across the collections of attention heads to generate a combined global output representation of the audio/video content;
multiply the combined global output representation of the audio/video content with a first learnable matrix to generate the global representation of the audio/video content; and
multiply the combined global output representation of the audio/video content with a second learnable matrix to generate a first weight matrix.

12. The apparatus of claim 11, wherein, to generate the local representation of the audio/video content, the at least one processor is configured to:
for each of the multiple collections of attention heads:
  divide each of the attention heads into multiple chunks in a temporal domain, the chunks of each attention head associated with the different portions of the audio/video content;
  use the chunks of the attention heads to generate local attention maps and generate first local output representations of the different portions of the audio/video content based on the local attention maps; and
  combine the first local output representations across the temporal domain to generate a second local output representation of the audio/video content;
combine the second local output representations of the audio/video content across the collections of attention heads to generate a combined local output representation of the audio/video content;
multiply the combined local output representation of the audio/video content with a third learnable matrix to generate the local representation of the audio/video content; and
multiply the combined local output representation of the audio/video content with a fourth learnable matrix to generate a second weight matrix.

13. The apparatus of claim 12, wherein, to combine the global representation of the audio/video content and the local representation of the audio/video content to generate the output representation of the audio/video content, the at least one processor is configured to:
use the first and second weight matrices to generate a global weight matrix for the global representation of the audio/video content and a local weight matrix for the local representation of the audio/video content;
multiply the global representation of the audio/video content with the global weight matrix to generate a weighted global representation of the audio/video content;
multiply the local representation of the audio/video content with the local weight matrix to generate a weighted local representation of the audio/video content; and
combine the weighted global representation of the audio/video content and the weighted local representation of the audio/video content to generate the output representation of the audio/video content.

14. The apparatus of claim 9, wherein:
the audio/video content comprises first content provided to a user; and
the at least one processor is further configured to identify or provide second content to the user based on a classification of the audio/video content.

15. The apparatus of claim 9, wherein the different portions of the audio/video content have different lengths.

16. The apparatus of claim 9, wherein the trained attention-based machine learning model is trained by:
obtaining training samples;
generating adversarial counterpart samples for the training samples; and
training the attention-based machine learning model using the training samples and the adversarial counterpart samples to (i) reduce or minimize differences between attention maps generated by the attention-based machine learning model for the training samples and the adversarial counterpart samples and (ii) reduce or minimize differences between output representations generated by the attention-based machine learning model for the training samples and the adversarial counterpart samples.

17. A non-transitory computer readable medium containing instructions that when executed cause at least one processor to:
obtain audio/video content; and
process the audio/video content with a trained attention-based machine learning model to classify the audio/video content;
wherein the instructions that when executed cause the at least one processor to process the audio/video content comprise instructions that when executed cause the at least one processor to:
  generate a global representation of the audio/video content based on the audio/video content;
  generate a local representation of the audio/video content based on different portions of the audio/video content; and combine the global representation of the audio/video content and the local representation of the audio/video content to generate an output representation of the audio/video content, the audio/video content classified based on the output representation.

18. The non-transitory computer readable medium of claim 17, further containing instructions that when executed cause the at least one processor to:
generate multiple matrices based on the audio/video content; and
divide each of the multiple matrices into multiple attention heads, the global and local representations of the audio/video content based on the attention heads.

19. The non-transitory computer readable medium of claim 18, wherein the instructions that when executed cause the at least one processor to generate the global representation of the audio/video content comprise instructions that when executed cause the at least one processor to:
for each of multiple collections of attention heads, use the attention heads to generate a global attention map and generate a global output representation of the audio/video content based on the global attention map;
combine the global output representations of the audio/video content across the collections of attention heads to generate a combined global output representation of the audio/video content;
multiply the combined global output representation of the audio/video content with a first learnable matrix to generate the global representation of the audio/video content; and
multiply the combined global output representation of the audio/video content with a second learnable matrix to generate a first weight matrix.

20. The non-transitory computer readable medium of claim 19, wherein the instructions that when executed cause the at least one processor to generate the local representation of the audio/video content comprise instructions that when executed cause the at least one processor to:
for each of the multiple collections of attention heads:
divide each of the attention heads into multiple chunks in a temporal domain, the chunks of each attention head associated with the different portions of the audio/video content;
use the chunks of the attention heads to generate local attention maps and generate first local output representations of the different portions of the audio/video content; and
combine the first local output representations across the temporal domain to generate a second local output representation of the audio/video content;
combine the second local output representations of the audio/video content across the collections of attention heads to generate a combined local output representation of the audio/video content;
multiply the combined local output representation of the audio/video content with a third learnable matrix to generate the local representation of the audio/video content; and
multiply the combined local output representation of the audio/video content with a fourth learnable matrix to generate a second weight matrix.

21. The non-transitory computer readable medium of claim 20, wherein the instructions that when executed cause the at least one processor to combine the global representation of the audio/video content and the local representation of the audio/video content to generate the output representation of the audio/video content comprise instructions that when executed cause the at least one processor to:
use the first and second weight matrices to generate a global weight matrix for the global representation of the audio/video content and a local weight matrix for the local representation of the audio/video content;
multiply the global representation of the audio/video content with the global weight matrix to generate a weighted global representation of the audio/video content;
multiply the local representation of the audio/video content with the local weight matrix to generate a weighted local representation of the audio/video content; and
combine the weighted global representation of the audio/video content and the weighted local representation of the audio/video content to generate the output representation of the audio/video content.

22. A method comprising:
obtaining training samples;
generating adversarial counterpart samples for the training samples; and
training an attention-based machine learning model to (i) generate a global representation of audio/video content based on the audio/video content, (ii) generate a local representation of the audio/video content based on different portions of the audio/video content, and (iii) combine the global representation of the audio/video content and the local representation of the audio/video content to generate an output representation of the audio/video content, the audio/video content classified based on the output representation;
wherein the attention-based machine learning model is trained using the training samples and the adversarial counterpart samples to (i) reduce or minimize differences between attention maps generated by the attention-based machine learning model for the training samples and the adversarial counterpart samples and (ii) reduce or minimize differences between output representations generated by the attention-based machine learning model for the training samples and the adversarial counterpart samples.

23. The method of claim 22, wherein training the attention-based machine learning model comprises using an adversarial loss function that includes an attention map-based regularization term.

24. The method of claim 23, wherein training the attention-based machine learning model comprises:
performing a first forward pass using the attention-based machine learning model to generate the attention maps for the training samples and determine a first loss representing a cross-entropy loss associated with the training samples;
performing a second forward pass using the attention-based machine learning model to generate the attention maps for the adversarial counterpart samples;
determining a second loss based on the attention map-based regularization term;
determining a third loss representing a cross-entropy loss associated with the adversarial counterpart samples;
determining a final loss by combining the first, second, and third losses; and
performing back propagation to update one or more model parameters of the attention-based machine learning model based on the final loss.

25. The method of claim 23, wherein the attention map-based regularization term comprises at least one of:
- a distance measure; and
- a divergence measure.

26. The method of claim 22, wherein:
- the training samples comprise audio samples and video samples;
- the adversarial counterpart samples comprise adversarial counterpart audio samples and adversarial counterpart video samples;
- the attention-based machine learning model comprises separate encoders for the audio samples and the video samples; and
- the encoders are trained during the training of the attention-based machine learning model.

27. The method of claim 22, wherein training the attention-based machine learning model comprises using an adversarial loss function that includes attention map-based regularization terms associated with global and local attention maps generated using the attention-based machine learning model.

\* \* \* \* \*